(12) United States Patent
Stooker et al.

(10) Patent No.: US 8,777,704 B2
(45) Date of Patent: Jul. 15, 2014

(54) METHOD AND APPARATUS FOR REMOVING THE KNEE CAP FROM A DEBONED POULTRY PART

(75) Inventors: Dirk Cornelis Stooker, Puttershoek (NL); Gerrit Hendrik Woltman, Goudswaard (NL)

(73) Assignee: Foodmate BV (NL)

( * ) Notice: Subject to any disclaimer, the term of this patent is extended or adjusted under 35 U.S.C. 154(b) by 199 days.

(21) Appl. No.: 13/534,487

(22) Filed: Jun. 27, 2012

(65) Prior Publication Data

US 2014/0004781 A1    Jan. 2, 2014

(51) Int. Cl.
*A22C 17/00* (2006.01)

(52) U.S. Cl.
USPC ....................................................... 452/135

(58) Field of Classification Search
USPC ......... 452/135, 136, 149–153, 156, 157, 166, 452/167
See application file for complete search history.

(56) References Cited

U.S. PATENT DOCUMENTS

| | | | |
|---|---|---|---|
| 2,807,046 A * | 9/1957 | Hebenheimer | 452/170 |
| 4,488,332 A * | 12/1984 | Atteck et al. | 452/136 |
| 4,811,457 A * | 3/1989 | Lindert | 452/136 |
| 5,401,210 A * | 3/1995 | Manmoto et al. | 452/136 |
| 5,462,477 A * | 10/1995 | Ketels | 452/135 |
| 5,490,812 A * | 2/1996 | Schaarschmidt | 452/138 |
| 5,810,653 A * | 9/1998 | Van Craaikamp et al. | 452/136 |
| 5,961,383 A * | 10/1999 | Janssen et al. | 452/135 |
| 7,004,830 B2 * | 2/2006 | van der Steen et al. | 452/185 |
| 7,597,615 B2 * | 10/2009 | van den Nieuwelaar et al. | 452/182 |
| 8,235,774 B2 * | 8/2012 | McBrayer et al. | 452/149 |

* cited by examiner

*Primary Examiner* — Richard Price, Jr.
(74) *Attorney, Agent, or Firm* — Womble Carlyle Sandridge & Rice LLP

(57) ABSTRACT

A method and apparatus for removing a knee cap from a poultry part, and particularly a deboned poultry thigh, includes a plurality of bays attached to an endless conveyor and movable by the conveyor in a processing direction. Each bay includes a plate sized to support a poultry thigh and having an aperture formed therethrough. A plunger assembly includes a plunger tip that can be moved selectively into and out of the aperture by a cam mechanism. Poultry parts are placed by workers on the plates as they move in the processing direction with the knee caps of the parts aligned with and pressed partially into the apertures. The cam mechanism then moves the plunger tip of each bay into its respective aperture to press the knee cap through the aperture, where it is severed by a rotating knife. The plunger tip is then withdrawn for a successive processing cycle.

28 Claims, 6 Drawing Sheets

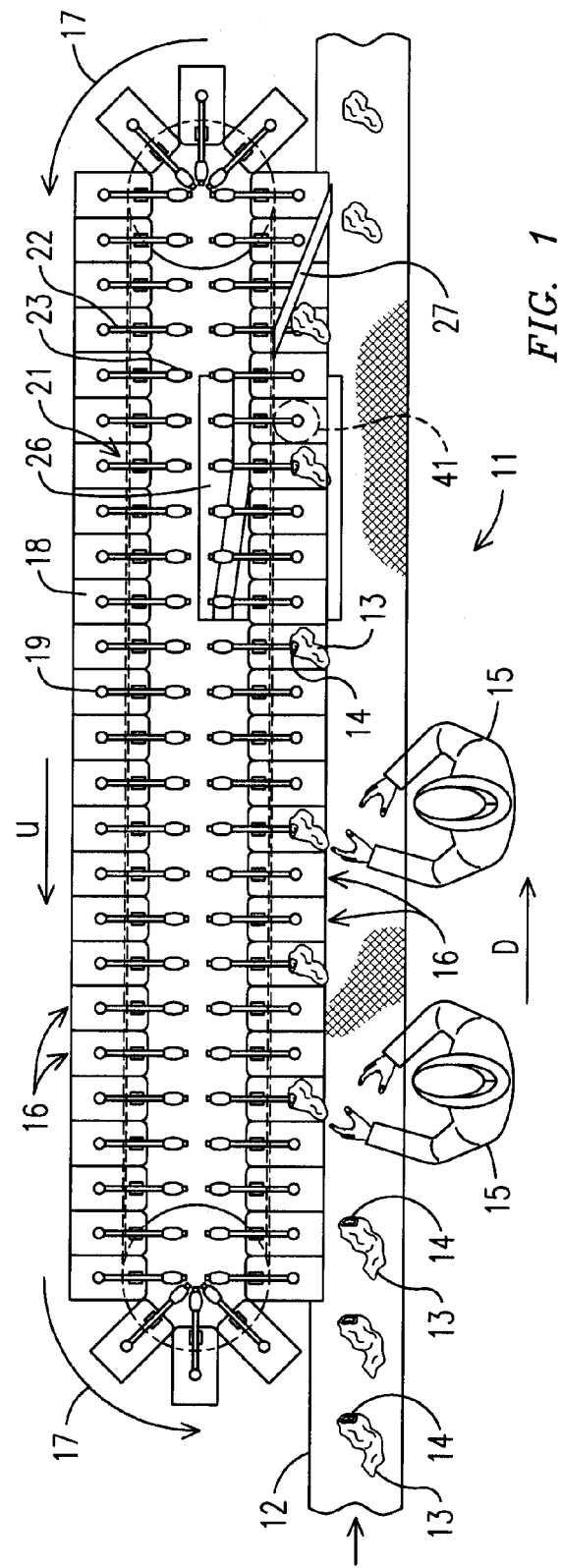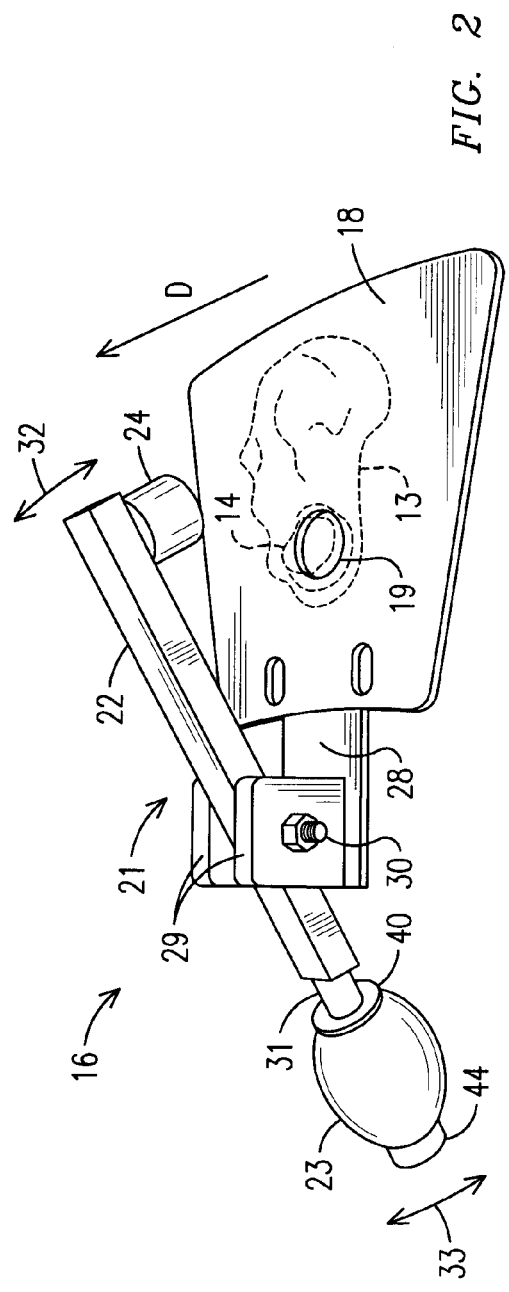

METHOD AND APPARATUS FOR REMOVING THE KNEE CAP FROM A DEBONED POULTRY PART

TECHNICAL FIELD

This disclosure relates generally to poultry processing equipment and methods and more particularly to the automated removal of a knee cap from the meat of a previously deboned poultry part such as a chicken thigh.

BACKGROUND

Thigh deboning machines for poultry processing lines are used to remove the thigh bone or femur from inside the thigh meat to produce a boneless chicken product. In one example of such a machine, poultry thighs are aligned between a rubber diaphragm with a central opening and a pusher rod. The pusher rod is caused to extend toward and possibly through the opening in the diaphragm. This pushes the thigh bone through the opening and the edges of the opening act to strip the meat from the bone as the bone moves through the diaphragm. The result is a piece of boneless thigh meat, which is desirable among the consuming public.

Although automated thigh deboning machines can successfully and cleanly strip thigh meat from a thigh bone, the knee cap of the poultry and associated tendons, cartilage, and other inedible tissue remain attached to the deboned thigh meat. This material must be removed from the thigh meat before the meat is sold to the public. In the past, this generally has been accomplished by human workers who, using sharp knives, stand along the poultry processing line and manually cut away the knee caps and tissue from previously deboned poultry thighs. Unfortunately, this manual step is expensive in human capital, is inconsistent from person to person and shift to shift, usually requires a number of employees to keep up with the line speed of the processing line, and is subject to human error and oversight. A need exists for an apparatus and method of removing the knee cap from deboned thigh meat that is mostly automated and is fast, consistent, and takes the place of at least some human workers on the line. It is to the provision of such an apparatus and method that the present invention is primarily directed.

SUMMARY

Briefly described, an apparatus for removing the knee cap from previously deboned poultry thighs such as chicken thighs includes a plurality of plates arranged to move in sequence along a processing line. Each plate has an aperture formed therethrough and the apertures are sized such that the knee cap and surrounding tissue of a deboned poultry thigh can fit through the aperture. A plunger is associated with each plate and includes a tip that has a shape and size corresponding to the shape and size of the aperture formed in the corresponding plate. Accordingly, the tip of each plunger is extendable through the aperture of the plate. In one embodiment, the aperture is circular and the tips of the plungers are cylindrical. Each plunger can be articulated by a cam or other mechanism to move the tip of the plunger between a second position spaced away from the aperture and a second position extending into the aperture.

In use, a worker loads previously deboned poultry thighs onto corresponding plates of the apparatus as the plates are carried past the worker along the processing path. Each poultry thigh is positioned and oriented by the worker such that the knee cap and related inedible tissue is aligned with and may extend partially into the aperture in the plate. Downstream of the worker, the plunger associated with each plate is engaged by a cam surface, which causes the tip of the plunger to move to its second position extending into and through the aperture in the plate. This, in turn, pushes the knee cap and associated tissue through the aperture until they project from and are exposed on the opposite side of the plate. Each plate then passes a rotating knife blade, which severs the projecting knee cap and tissue from the thigh meat allowing it to fall away for collection. Further downstream, each plunger is articulated to cause its tip to retract from the aperture and move to its second position spaced away from the aperture, leaving the thigh meat with knee cap and tissue removed resting on the plate. A sweep arm may then sweep the meat onto a conveyor, which moves it further along the line for further processing, packaging, or the like. The plate is then ready for reloading in a subsequent processing cycle.

Thus, an automated apparatus and method are now disclosed that address the above discussed needs and others associated with the removal of the knee cap and related inedible tissue from a deboned poultry thigh. These and other features, aspects, and advantages of the apparatus and method of the invention will be better appreciated by the skilled artisan upon review of the detailed description set forth below taken in conjunction with the accompanying drawing figures, which are briefly described as follows.

BRIEF DESCRIPTION OF THE DRAWINGS

FIG. 1 is a top plan view of an apparatus that embodies principles of the disclosed invention in one preferred form.

FIG. 2 is a perspective view of one of the many bays of the apparatus of FIG. 1 showing one embodiment of a plate and plunger assembly with the tip of the plunger retracted away from the aperture of the plate.

DETAILED DESCRIPTION

Figure 3:
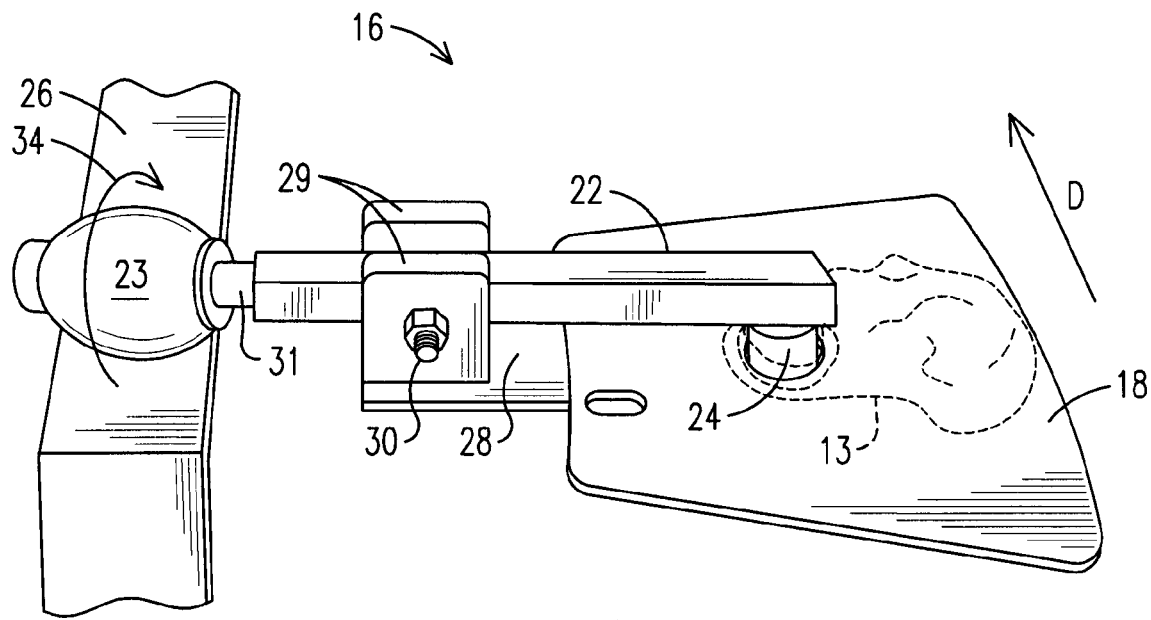
FIG. 3 is a perspective view of the station of FIG. 2 showing the plunger articulated to extend the tip of the plunger through the aperture in the plate.

The leg of poultry such as a chicken includes a thigh bone or Femur movably coupled to a leg bone or Tibia at the knee. Meat surrounds the Femur and Tibia and a knee cap is located over the coupled ends of the bones. Various ligaments and other inedible tissue are associated with the knee cap. In a typical automated thigh deboning operation or whole leg deboning operation, the thigh bone usually is separated from the meat of the thigh by pushing the bone through a stripper disc or other device. This strips the thigh meat from the thigh bone, allowing the thigh bone to drop into a collection bin. However, the knee cap and its associated tissue remain attached to the stripped away meat and must be removed. The apparatus and method of this invention accomplishes this, as detailed below.

Referring now in more detail to the drawing figures, wherein like reference numeral where appropriate indicate like parts throughout the several views, FIG. 1 illustrates a poultry processing station or apparatus that embodies principles of the invention. The apparatus 11 includes a linear conveyor 12 that moves in a downstream processing direction D past one or more workers 15. The conveyor carries poultry thighs 13 that have previously been deboned at another processing station such as a thigh deboner or a whole leg deboner. The deboned thighs 13 comprise thigh meat with the inedible knee cap and associated tendons and tissue 14 still attached to the meat as described above. The apparatus 11 further comprises a plurality of individual bays 16 attached in a known manner to an endless conveyor such that the bays move sequentially as indicated by arrows 17 first along a processing path in the downstream direction D past the workers 15 thence along a return path in the upstream direction U for a subsequent cycle.

As described in more detail below, each of the individual bays 16 includes a plate 18 having an aperture 19 formed therethrough. A plunger assembly 21 is associated with each of the plates and, in the embodiment of FIG. 1, includes a pivoting arm 22 having a plunger tip 24 (FIG. 2) attached at an end of the arm overlying the plate and a cam follower mounted to the opposite end of the pivoting arm. The plunger tip is aligned with respect to the aperture in its corresponding plate in such a way that when the pivoting arm 22 pivots toward the plate 18, the plunger tip is guided into and at least partially through the aperture 19 in the plate. Conversely, when the pivoting arm 22 is pivoted away from the plate 18, the plunger tip is moved out of and away from the aperture 19.

A cam 26 is disposed along the processing path downstream of the workers 15. The cam 26 is positioned and configured such that the cam followers 23 of the bays engage the cam 26 as the bays move past the cam. The cam followers 23 follow the cam 26 in such a way as to cause the pivoting arms 22 of the bays to pivot toward the plates of their corresponding bays to move the plunger tips of the arms into and at least partially through the apertures of their respective plates. As the bays move beyond the cam surface 26, the pivoting arms pivot away from their plates to move the plunger tips out of and away from the apertures. Accordingly, the pivoting arms are configured to move the plunger tips between second positions extending into and at least partially through their corresponding apertures and second position spaced away from their corresponding apertures.

In operation, workers 15 remove the deboned thighs 13 from the passing linear conveyor and position or load each thigh on the plate 18 of one of the bays 16 with the knee cap and associated tissue 14 aligned with and extending partially into the aperture of the plate. The knee caps may be pressed partially into the apertures by the workers as they load the thighs onto the bays. As each of the loaded bays moves downstream past the cam surface 26, engagement of its cam follower 23 with the cam 26 causes the pivoting arm to pivot and thereby move the plunger tip of the bay to its second position extending into the aperture. This, in turn, presses the knee cap and associated tissue of the deboned thigh through the aperture until it projects or protrudes from the bottom of the plate.

With the plunger tip holding the knee cap and tissue in this protruding and exposed position, the bay moves past a rotating knife 41 (FIG. 4b) located below the moving bays and aligned with the apertures thereof. The knife slices off the protruding knee cap and tissue, which falls away to be collected and/or further processed. Each loaded bay then moves beyond the cam surface 26 and the pivoting arm pivots away from its plate to withdraw the plunger tip from the aperture and move it to its second position spaced away from the plate. Each bay then passes a sweep 27, which rakes the deboned thighs with knee caps and associated tissue now removed back onto the conveyor 12, which conveys them downstream for further processing.

FIG. 2 is an enlarged perspective of one of the bays of the station according to an embodiment of the invention. The bay 16 includes a plate 18 preferably made of stainless steel or another non-corrosive material. An aperture 19 is formed through the plate 18 at a central location. The aperture 19 is circular in this embodiment, but may be any other appropriate shape such as oval, square, triangular, or otherwise, all within the scope of the invention. The aperture is sized such that the knee cap and associated tendons and other inedible tissue can be pressed relatively easily and substantially completely through the aperture. For processing chicken thighs, for example, it has been found that an aperture with a diameter between about 1 cm and 5 cm and more particularly about 2.5-3 cm functions well in this regard. Clearly, different sized apertures are required for different types of poultry such as turkey, for example, which has larger knee caps than chickens. The plate 18 has an area that is sufficient to receive and support a deboned poultry thigh 13, which is indicated in phantom lines in FIG. 2. A thigh is placed on the plate 18 by a worker with the thigh meat supported by the plate and the still attached knee cap 14 and related tissue aligned with and preferably pressed partially through the aperture 19 in the plate 18.

In the embodiment of FIG. 2, a support 28 is attached to the back edge of the plate 18 and extends rearwardly to support a bracket 29 having spaced walls. A plunger arm 22 extends between the spaced walls of the bracket 29 and is pivotally connected to the bracket on a pivot pin 30 extending through the bracket and the plunger arm. Accordingly, the plunger arm 22 can pivot about the pivot pin 30 such that its ends move in the directions indicated by arrows 32 and 33 respectively. A plunger tip 24 is secured to the end of the pivot arm overlying the plate 18 and projects downwardly therefrom. The plunger tip 24, which is cylindrical in shape in this embodiment to match the shape of the aperture, is positioned and oriented on the pivot arm 22 such that when the pivot arm 22 pivots toward the plate 18, the plunger tip moves to a second position extending into and at least partially through the aperture 19 in the plate. The diameter of the plunger tip is less than the diameter of the aperture to define a clearance that allows the tip to pass through the aperture without becoming jammed by the tissue of a poultry thigh as it does so. It has been found that for processing chicken thighs, a clearance in the range of about 1 mm to about 5 mm functions well with a preferred clearance being about 2-3 mm, although this is not limiting.

An axle 31 projects from the opposite end of the pivot arm 22 and is provided with a stop 40 at a predetermined location. A cam follower 23, which in this case is oblong or egg-shaped, is rotatably mounted on the axle 31 and is captured on the axle between the stop 40 and a retainer 44, fixed on the end of the axle 31. The cam follower 23 may be made of plastic or another appropriate material and preferable is freely rotatable about the axle 31. The pivoting arm 22 with cam follower and plunger tip is balanced such that in its normal condition, gravity maintains the plunger tip in its second position spaced away from the aperture as illustrated in FIG. 2. The pivoting arm also may be biased to this position by appropriate springs and the like as an alternative.

As detailed below, as the bay 16 moves in a downstream direction D, the cam follower may encounter a ramped surface of a cam, which causes the cam follower to ride up the cam surface. This, in turn, pivots the pivoting arm 22 toward the plate 18 until the plunger tip 24 moves to its second position extending at least partially through the aperture 19. In doing so, the plunger tip presses the knee cap and related tissue substantially completely through the aperture until it protrudes through the aperture from the bottom of the plate in position to be sliced away with, for example, a rotating knife. When the knee cap is sliced off, the cam follower moves beyond the cam surface and the balancing of the pivoting arm causes the pivoting arm to pivot upwardly and move the plunger tip 22 to its second position spaced away from the plate 18 in preparation for reloading during a next cycle of operation.

FIG. 3 shows the bay 16 as it appears when the cam follower 23 has moved upwardly and onto a surface of a cam 26. It can be seen that this has caused the pivot arm 22 to pivot toward the plate 18 and the plunger tip 24 to press the knee cap and related tissue, which was aligned with the aperture by a worker, through the aperture. While not visible in FIG. 3, the knee cap and related tissue that is pressed through the aperture protrude downwardly and are exposed on the underside of the plate 18 to be sliced off as detailed below.

Figure 4A:
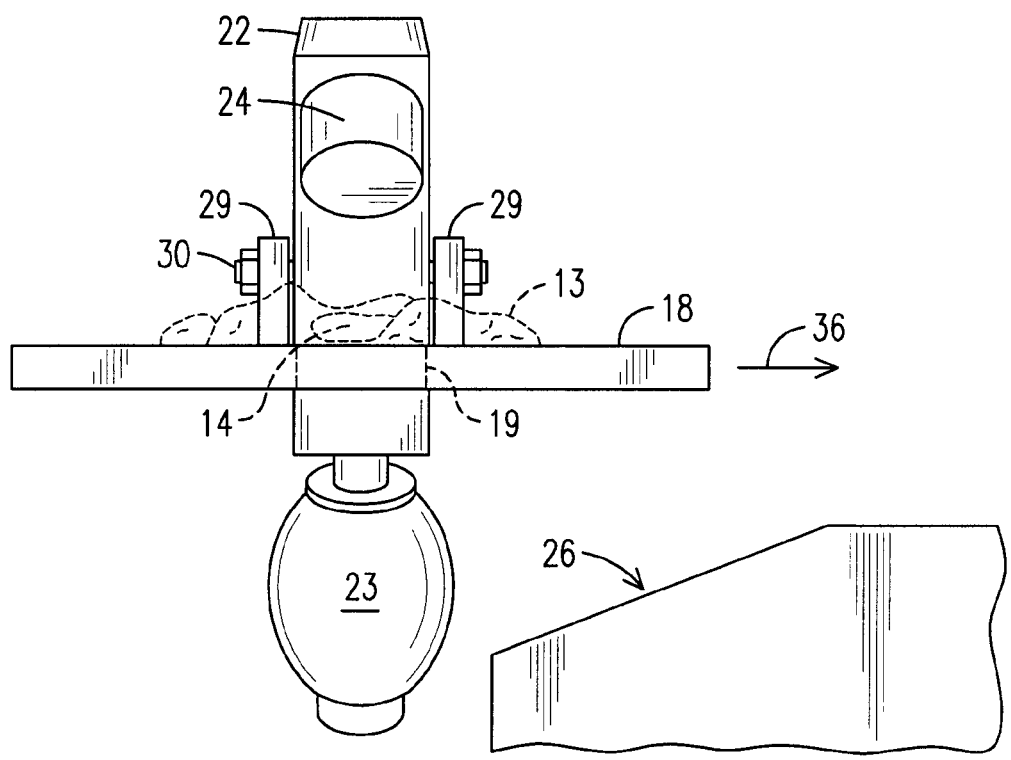
FIGS. 4a-4c is a sequence of images viewed from the end of the plate of FIGS. 2 and 3 illustrating the operation of the apparatus of this disclosure to remove the knee cap and related tissue from a deboned poultry thigh.
Figure 4B:
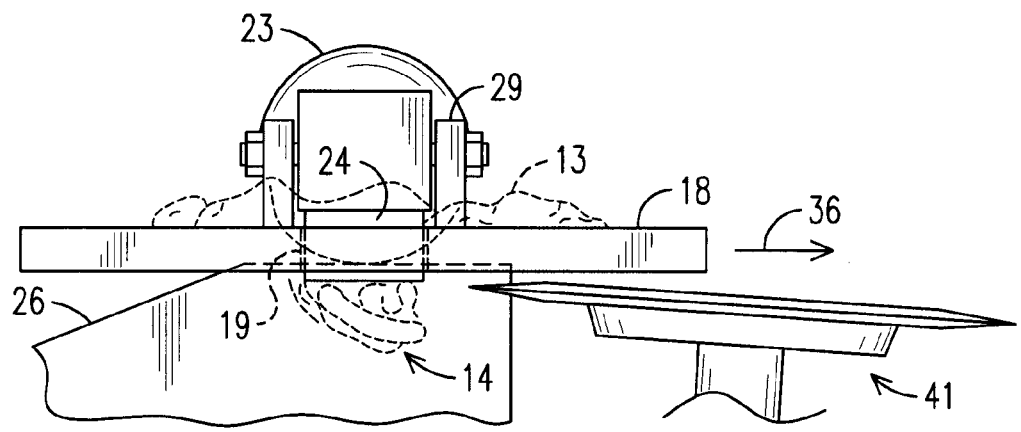
Figure 4C:
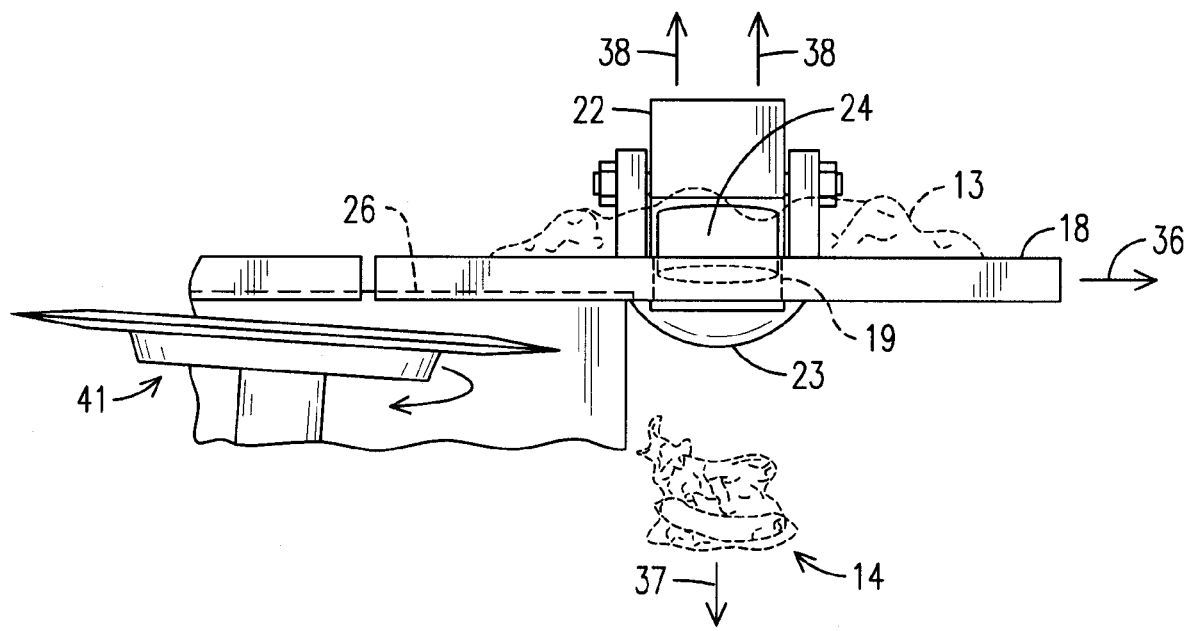

FIGS. 4a through 4c are views from the outer edge of a bay 16 illustrating progressively the methodology of the present invention for removing a knee cap and related tissue from a deboned poultry thigh. In FIG. 4a, the bay, which has previously been loaded with a deboned thigh 13 having an attached knee cap aligned with the aperture 19, is seen moving from left to right in the direction indicated by arrow 36. The cam follower 23 is approaching the surface of a cam 26, up which the cam follower will ride to move the pivoting arm 22 downwardly toward the plate 18 of the bay as described. In FIG. 4b, the bay has moved further downstream in the direction of arrow 36 and the cam follower 23 has ridden up onto the top surface of the cam 26. This, in turn, has caused the plunger tip 24 to move to its second position extending at least partially through the aperture 19. In the process, the plunger tip 24 presses the knee cap 14 and related inedible tissue of the deboned thigh substantially completely through the aperture. This material protrudes from the aperture on the bottom side of the plate 18 as illustrated in FIG. 4b and approaches a rotating knife 41 to be sliced away from the meat of the thigh.

With the plunger tip 22 in place holding the knee cap and tissue 14, the bay passes the rotating knife, which cuts through the tissue near the aperture to slice the knee cap and its tissue from the remaining meat of the thigh. In FIG. 4c, the bay has moved beyond the rotating knife and the knee cap and tissue 14 has been sliced off and is seen falling away for collection and/or further processing. In the mean time, the cam follower 23 has just moved beyond the cam 26 and is dropping down under the influence of gravity to raise the pivoting arm 22 and thus retract the plunger tip 24 from the aperture 19 and move it to its second position spaced away from the aperture. The pivoting arm 22 eventually rises up to the position shown in FIG. 2 and the bay 16 is configured to be loaded with another deboned poultry thigh in a next cycle of the apparatus. As this occurs, the deboned thigh meat, now with knee cap and related inedible tissue cut away, may be removed from the plate 18 and collected or conveyed to a subsequent processing station as desired. In the preferred embodiment, this function is accomplished by a sweep arm (27 in FIG. 1) that rakes the thigh meat from the plates of the bays onto a waiting conveyor or collection bin.

Figure 5:
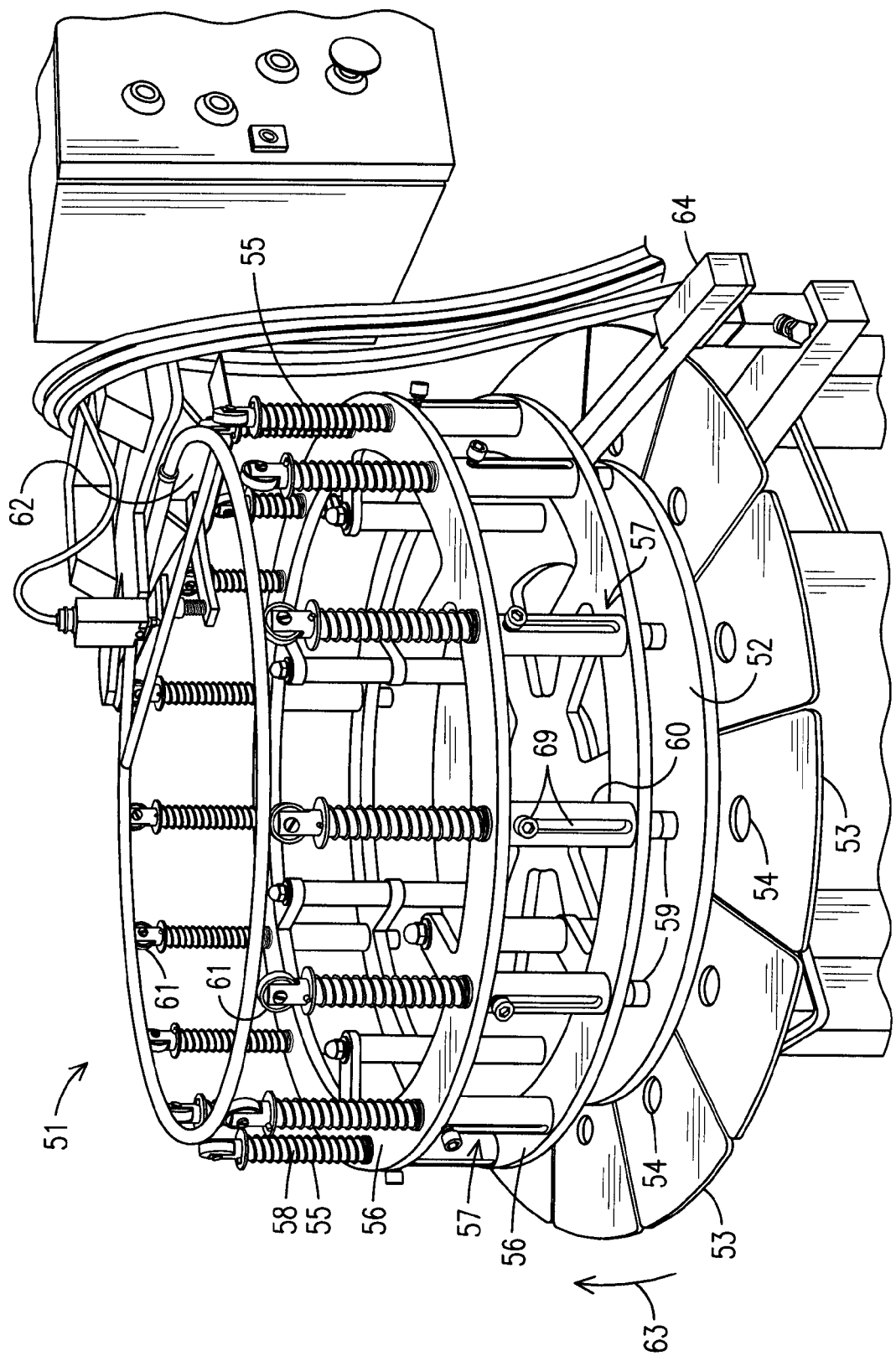
FIG. 5 is a perspective view showing another embodiment of an apparatus for removing knee caps from deboned poultry thighs according to the disclosure.
Figure 6:
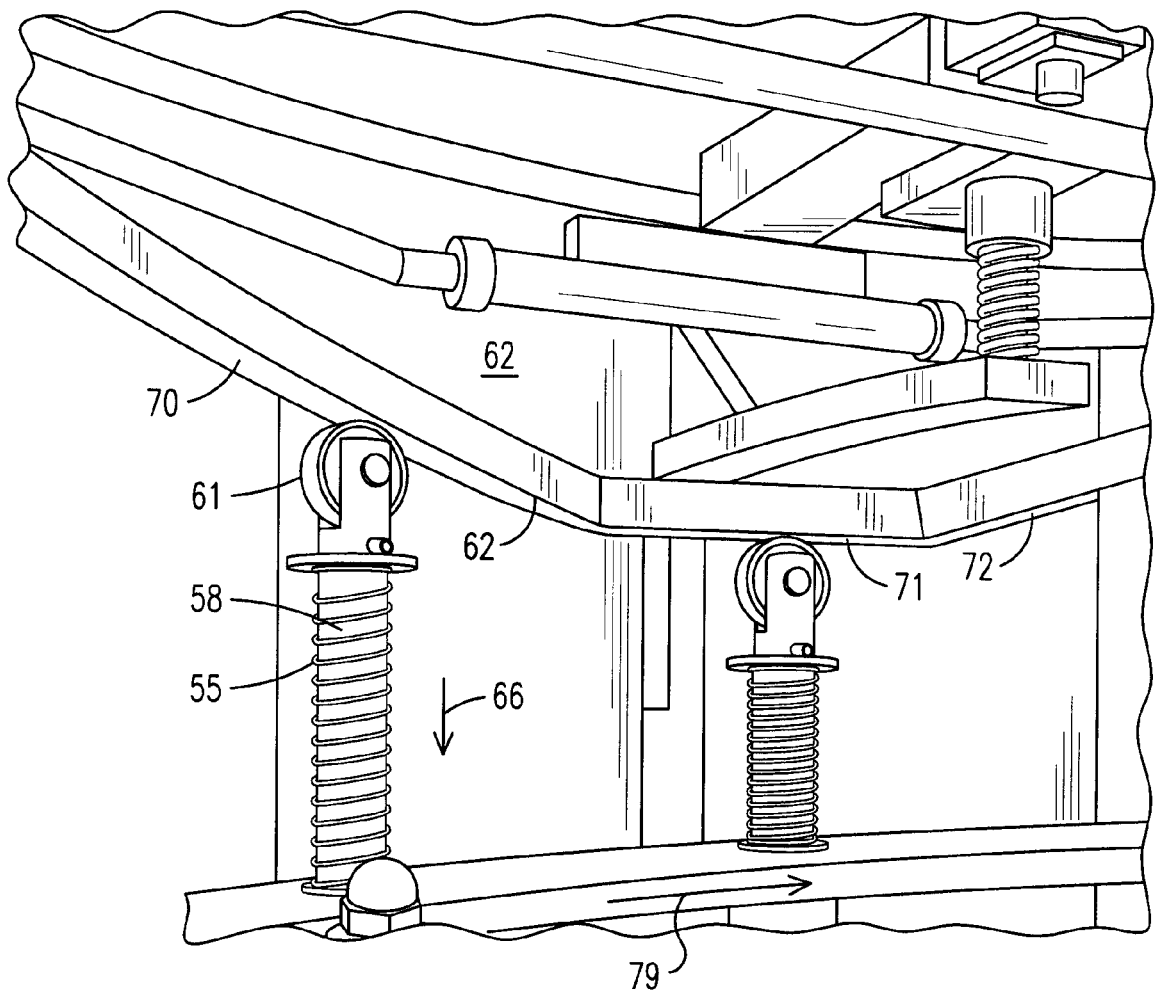
FIG. 6 is an enlarged perspective view of a portion of the apparatus of FIG. 5 illustrating the cam followers of the plungers engaging with a cam to force the tips of the plungers through the apertures of plates below.

FIGS. 5 and 6 illustrate an alternate embodiment of the apparatus of the present invention. While the principle is the same as described above, the structure and function of this embodiment is different. Here, the apparatus 51 comprises a rotatable carrousel 52 driven by a motor and drive train (not shown) to rotate in the direction of arrow 63. A plurality of plates 53 are attached to and arrayed around the carrousel and each plate 53 has an aperture 54 extending therethrough. A pair of vertically spaced apart annular supports 56 is mounted to the carrousel 52 and rotates therewith. A plurality of sleeves 60 extend between the spaced annular supports at equally spaced intervals and the sleeves are secured to the annular supports. The sleeves 60 are each aligned directly above an aperture 54 of a corresponding underlying plate 53 and a plunger rod 58 is slidably disposed within each of the sleeves 60.

Each plunger rod 58 terminates in a plunger tip 59 that also is aligned with an aperture below. The plunger rods 58 can slide within their sleeves 60 in a vertical direction between a raised or second position wherein the plunger tips are spaced away from the apertures of their respective plates and a lowered or second position wherein the plunger tips extend into and at least partially through their respective apertures. A pin and slot arrangement 69 define the upper and lower limits of movement of the plunger rods. A spring 55 is disposed about each plunger rod between the upper annular support 56 and the top of the plunger rod and normally biases the plunger rods to their upward positions as shown in FIG. 5. Each plunger rod terminates at is upper extent in a rotating cam follower 61 oriented in the direction of rotation of the carrousel 52. A cam 62 is located at a predetermined location around the path of travel of the plunger rods and is positioned to be engaged by the cam followers 61.

FIG. 6 illustrates engagement of the cam followers 61 of the plunger rods 58 with the cam 62 to move the plunger rods downwardly until the plunger tips extend into and at least partially through the apertures of corresponding plates below. The cam 62 is seen to be shaped with a declining cam surface 70, a level cam surface 71, and an inclining cam surface 72. The carrousel moves in direction 79 in FIG. 6. As each plunger rod 58 approaches the cam 62, the cam follower 61 of the rod first engages and begins to follow the declining cam surface 70. This, in turn, causes the plunger rod 58 to begin to move downwardly against the bias of the spring 55 until the cam follower 61 reaches the level cam surface 71. At this point, the plunger tip at the other end of the plunger rod has moved to its second position extending into and at least partially through the aperture of its corresponding plate to press the knee cap and associated tissue of a deboned thigh through the aperture as described above. While the plunger rod and tip are held in this position by the level surface 71 of the cam 62, a rotating knife 76 (FIG. 7) below the plates slices off the protruding knee cap and related tissue, which fall away. The cam follower 61 of the plunger rod then encounters and rides up the inclined cam surface 72, which allows the plunger rod to rise under the bias of its spring 55 until the plunger tip is located in its second position spaced away from its plate. The thigh meat still resting on the plate can then be removed by a sweep arm or other structure and collected for further processing.

Figure 7:
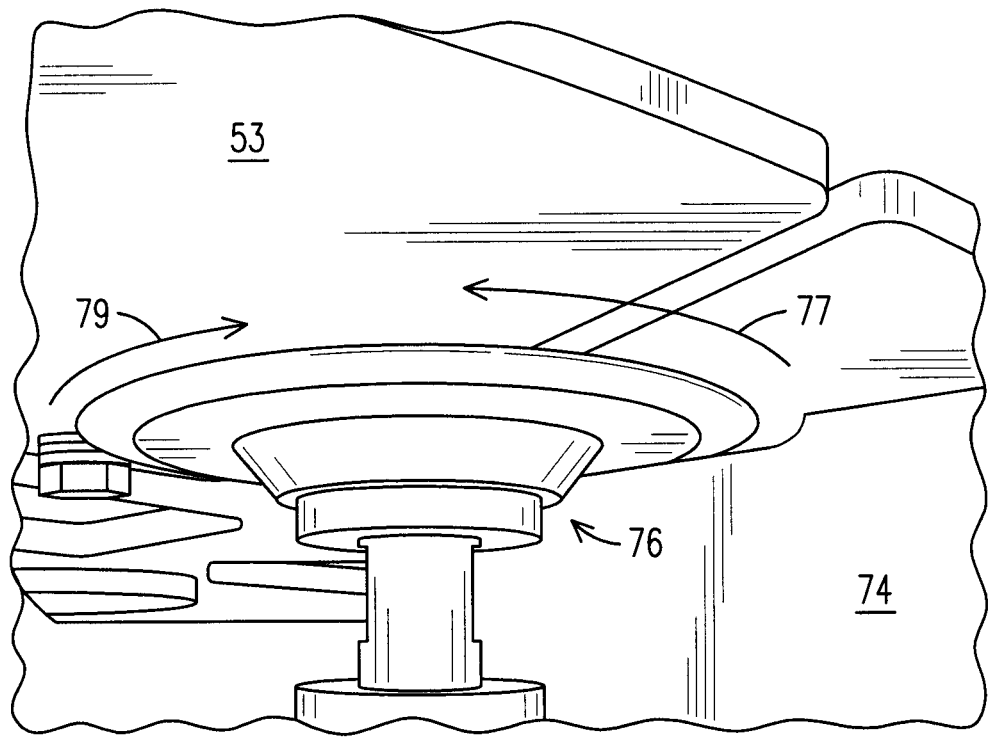
FIG. 7 is an enlarged perspective view of a rotating blade located on the bottom sides of the plates of the apparatus of FIG. 5 and aligned with the apertures of the plates to slice off knee caps and associated tissue pressed by the tips of the plungers through the apertures of the plates.
Figure 8:
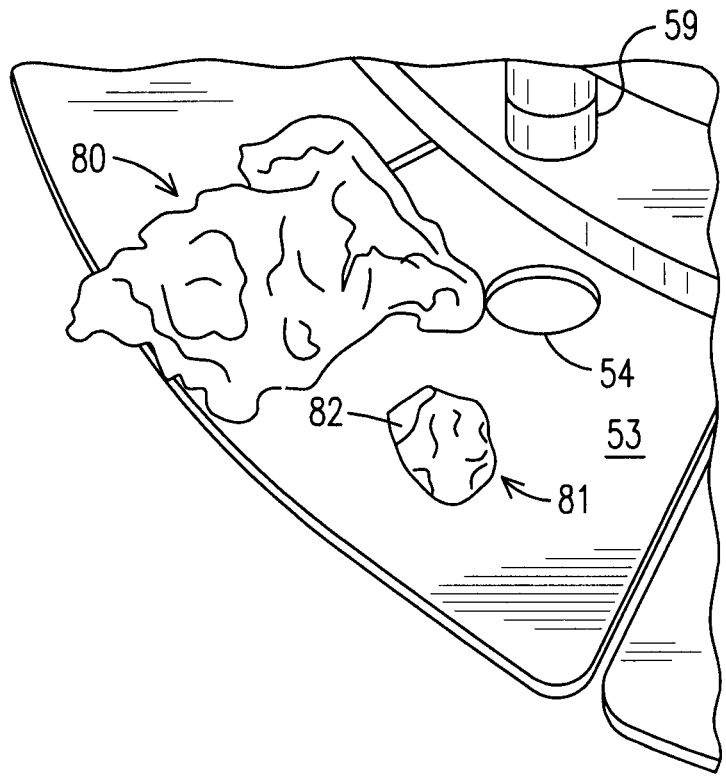
FIG. 8 shows a piece of thigh meat located beside a knee cap and related inedible tissue that has been severed from the thigh meat according to the invention.

FIG. 7 is an enlarged perspective view from beneath the plates 53 showing the rotating knife 76 for severing protruding knee caps and related tissue from a thigh. The rotating knife rotates in direction 79 (or the opposite direction) and is aligned beneath the plates 53 such that the apertures in the plates pass the rotating knife 76 as the plates move in direction 77. In the illustrated embodiment, a divider plate 74 is disposed beneath the plates and the blade of the rotating knife extends through a notch in the plate to its other side. In this way, when a protruding knee cap is sliced off upon encountering the knife, if falls on the opposite side of the divider plate for collection. The rotating knife is angled such that the edge of its blade passes close to the bottoms of the plates to ensure that substantially all of the protruding knee cap and tissue are cut away upon encountering the rotating knife. In FIG. 8, a deboned thigh is shown next to a knee cap and associated tendons anf tissue that has been removed from the thigh meat according to the invention. The thigh 80 is seen to comprise virtually all edible meat and the knee cap and related tissue 81 is cleanly sliced from the thigh meat, as indicated at 82.

The invention has been described herein in terms of preferred embodiments and methodologies considered by the inventors to represent the best mode of carrying out the invention. However, the illustrated and discussed embodiments are presented only as examples and the invention is not limited to these embodiments. A wide variety of additions, deletions, and modifications, both subtle and gross, might well be made to the illustrated embodiments by the skilled artisan without departing from the spirit and scope of the invention as set forth in the claims. For instance, the invention is described in the context of removing a knee cap from a poultry part. However, the method and apparatus of the invention also may be applied to removing virtually any difficult-to-remove bones from poultry and indeed from other meets such as pork, beef, lamb, and the like. The scope of the invention is intended to cover these and other variations that may be made by the skilled artisan.

What is claimed is:

1. A method of removing a knee cap from a poultry part comprising the steps of:
   (a) aligning the knee cap of the poultry part with an aperture formed through a plate;
   (b) urging the knee cap through the aperture until at least a portion of the knee cap protrudes from the aperture on an opposite side of the plate;
   (c) severing the protruding knee cap from the poultry part;
   (d) collecting the severed knee cap; and
   (e) collecting the poultry part from which the knee cap has been removed.

2. The method of claim 1 wherein the plate is substantially horizontally oriented and step (a) comprises placing the poultry part on top of the plate with the knee cap aligned with the aperture.

3. The method of claim 1 wherein step (b) comprises moving a plunger tip through the aperture to press the knee cap through the aperture.

4. The method of claim 1 wherein step (c) comprises cutting the protruding knee cap.

5. The method of claim 4 wherein the step of cutting comprises moving the plate past a knife aligned with the aperture.

6. The method of claim 5 wherein moving the plate past a knife comprises moving the plate past a rotating knife.

7. The method of claim 1 wherein step (d) comprises allowing the severed knee cap to fall away from the plate to a collection area.

8. The method of claim 1 wherein step (e) comprises engaging the poultry part with a sweep arm configured to urge the poultry part away from the plate.

9. The method of claim 1 wherein the poultry part is a deboned poultry part.

10. The method of claim 9 wherein the deboned poultry part comprises a deboned thigh.

11. The method of claim 10 wherein the deboned thigh comprises the thigh of a chicken.

12. The method of claim 1 wherein inedible tissue is associated with the knee cap and wherein step (b) comprises urging the knee cap and associated inedible tissue through the aperture.

13. The method of claim 12 wherein step (c) comprises severing the knee cap and associated tissue from the poultry part.

14. An apparatus for removing a knee cap from a poultry part comprising:
   at least one bay comprising a plate with an aperture formed therethrough, the plate being arranged such that the poultry part can be located against the plate with the knee cap of the poultry part substantially aligned with the aperture;
   a plunger associated with the at least one plate, the plunger having a plunger tip sized to move through the aperture in the plate;
   a mechanism for selectively moving the plunger tip between a first position spaced away from the aperture and a second position extending into the aperture;
   the mechanism moving the plunger tip to its first position for locating a poultry part against the plate and moving the plunger tip to its second position after the poultry part is located against the plate to urge the knee cap through the aperture until it protrudes from the other side of the plate; and
   a blade on the other side of the plate arranged to sever the protruding knee cap from the poultry part.

15. The apparatus of claim 14 wherein the plate is oriented substantially horizontally such that the poultry part can be placed atop the plate with the knee cap substantially aligned with the aperture.

16. The apparatus of claim 14 wherein the plunger comprises a plunger arm pivotally mounted adjacent the plate, the plunger arm having a first end that moves toward and away from the plate when the plunger rod is pivoted and a second end, the plunger tip being mounted to the first end of the plunger arm and the mechanism for moving the plunger tip being configured to pivot the plunger arm selectively to move the plunger tip between its first and second positions.

17. The apparatus of claim 16 wherein the mechanism comprises a cam follower at the second end of the plunger arm and a cam surface, the cam follower and cam surface movable relative to one another and configured such that engagement of the cam follower with the cam surface pivots the plunger arm to move the plunger tip to its second position.

18. The apparatus of claim 17 wherein the cam follower moves and the cam surface is stationary.

19. An apparatus for removing knee caps from a plurality of poultry parts, the apparatus comprising:
   a plurality of bays for receiving poultry parts;
   a mechanism for moving the plurality of bays in side-by-side relationship in a processing direction;
   each bay comprising a plate having an aperture formed therethrough and a plunger assembly associate with the plate, the aperture being sized to receive a knee cap of a poultry part resting on the plate;
   each plunger assembly including a plunger tip sized to be received through the aperture and being attached to a plunger assembly including a cam follower configured to move the plunger tip between a first position spaced away from the aperture and a second position extending into the aperture upon engagement of the cam follower with a cam located along the processing path;

the plunger tip pressing a knee cap of a poultry part resting on the plate through the aperture to expose the knee cap on an opposite side of the plate; and a knife located on the opposite side of the plate and positioned to sever the exposed knee cap from the poultry part as the bay passes the knife.

20. The apparatus of claim 19 wherein the mechanism for moving the plurality of bays comprises an endless conveyor.

21. The apparatus of claim 19 wherein the plunger assembly comprises a plunger arm pivotally mounted relative to the plate, the plunger tip being attached to the plunger arm at one end, and the plunger arm moving the plunger tip to its first position when pivoted in one direction and to its second position when pivoted in an opposite direction.

22. The apparatus of claim 21 wherein the cam follower is mounted to the plunger arm at an end opposite the one end and wherein the cam surface is located to engage the cam followers of the plurality of bays as the bays move in the processing direction past the cam surface.

23. A method of removing a knee cap from a deboned poultry thigh comprising the steps of aligning the knee cap with an aperture sized to receive the knee cap, pressing the knee cap through the aperture to expose the knee cap on an opposite side of the aperture, and severing the exposed knee cap from the poultry thigh.

24. The method of claim 23 wherein aligning the knee cap with an aperture comprises at least partially pressing the knee cap into the aperture.

25. A method of removing a bone from a meat part comprising the steps of:

(a) aligning the bone of the meat part with an aperture formed through a plate;

(b) urging the bone through the aperture until at least a portion of the bone protrudes from the aperture on an opposite side of the plate;

(c) severing the protruding bone from the poultry part;

(d) collecting the severed bone; and (e) collecting the meat part from which the bone has been removed.

26. The method of claim 25 wherein the bone comprises a knee cap and the meat part comprises a poultry part.

27. An apparatus for removing a bone from a meat part comprising:

at least one bay comprising a plate with an aperture formed therethrough, the plate being arranged such that the meat part can be located against the plate with the bone of the meat part substantially aligned with the aperture;

a plunger associated with the at least one plate, the plunger having a plunger tip sized to move through the aperture in the plate;

a mechanism for selectively moving the plunger tip between a first position spaced away from the aperture and a second position extending into the aperture;

the mechanism moving the plunger tip to its first position for locating a meat part against the plate and moving the plunger tip to its second position after the meat part is located against the plate to urge the bone through the aperture until it protrudes from the other side of the plate; and a blade on the other side of the plate arranged to sever the protruding bone from the meat part.

28. The apparatus of claim 27 wherein the bone comprises a knee cap and the meat part comprises a poultry part.

* * * * *